United States Patent [19]
Watanabe et al.

[11] Patent Number: 5,587,635
[45] Date of Patent: Dec. 24, 1996

[54] ROBOT CONTROL APPARATUS FOR MONITORING LOAD ON ROBOT

[75] Inventors: Atsushi Watanabe, Oshino-mura; Ryo Nihei; Akihiro Terada, both of Fujiyoshida, all of Japan

[73] Assignee: Fanuc Ltd., Japan

[21] Appl. No.: 446,713

[22] PCT Filed: Sep. 27, 1994

[86] PCT No.: PCT/JP94/01582
§ 371 Date: May 30, 1995
§ 102(e) Date: May 30, 1995

[87] PCT Pub. No.: WO95/09479
PCT Pub. Date: Apr. 6, 1995

[30] Foreign Application Priority Data

Sep. 30, 1993 [JP] Japan .................................. 5-265526

[51] Int. Cl.$^6$ .................................................. H02K 17/32
[52] U.S. Cl. .................... 318/434; 318/271; 318/568.25; 318/689
[58] Field of Search .................... 318/649, 611, 318/798, 254, 138, 432, 433, 617, 618, 431, 139, 276, 271, 434, 568.25, 689, 635; 388/930

[56] References Cited

U.S. PATENT DOCUMENTS

| | | | |
|---|---|---|---|
| 4,791,575 | 12/1988 | Watts, Jr. et al. | 318/569 |
| 4,814,678 | 3/1989 | Omae et al. | 318/434 |
| 4,882,528 | 11/1989 | Sogabe et al. | 318/568.1 |
| 4,992,715 | 2/1991 | Nakamura et al. | 318/611 |
| 5,345,155 | 9/1994 | Masaki et al. | 318/138 |

FOREIGN PATENT DOCUMENTS 2-30487   1/1990   Japan .
4-312378  11/1992  Japan .

*Primary Examiner*—John W. Cabeca
*Attorney, Agent, or Firm*—Staas & Halsey

[57] ABSTRACT

A robot control apparatus in which a load exerted on a driving system of a robot is detected to make it easy to judge a time for preventive maintenance or overhaul, and life of the robot driving system. A driving torque Ta outputted to the driving system is found by subtracting a torque which is spent in a motor itself for accelerating or decelerating a rotor from an output torque T of a motor M for driving each axis of the robot. Further, an average torque of the driving torque Ta and an average speed of an output shaft of the motor M are found and displayed. An average torque of an output torque of a speed reducer and an average speed of an output shaft of the speed reducer are obtained, and, based on these values, the life of the speed reducer is determined. Then a ratio of the determined life to a rated life is obtained and displayed. An actual load exerted on the driving system is monitored, so that the time for the preventive maintenance or overhaul, and life of the driving system is easily judged. Also, the life of the speed reducer is easily predicted.

8 Claims, 3 Drawing Sheets

ROBOT CONTROL APPARATUS FOR MONITORING LOAD ON ROBOT

BACKGROUND OF THE INVENTION

1. Field of the Invention

The present invention relates to a robot control apparatus for monitoring a load on a robot, in which a load exerted on a driving mechanism of a robot is monitored and utilized for a life prediction and a preventive maintenance of the robot.

2. Description of the Related Art

A driving mechanism of a robot usually employs mechanical elements such as a bearing and a speed reducer. A load exerted on these mechanical elements in the driving mechanism of the robot fluctuates unlike that in a general power unit. Therefore, it is difficult to predict the life of, and the time for the maintenance or overhaul of these mechanical elements.

As a deterioration analysis through robot torque analysis, there is known a method in which the change in the torque of a driving motor is used to predict a trouble from a pattern of the torque change. However, in this method, the torque including accelerating torque of a part such as the rotor of a motor is used, for evaluating a predication and is not used to find a torque actually loaded on a driving system. In order to predict a degradation and life of mechanical elements of a driving system of a robot, it is necessary to find a torque actually exerted on mechanical elements of a driving system. Furthermore, in this method, a pattern of an output torque of a motor is drawn using a plotter or the like to evaluate the pattern, so that the state of the load cannot be measured in real time during robot operation.

Also known is a method of finding a load exerted on the motor by determining the driving torque of the motor and the square mean thereof. This method, however, is for finding the load on the motor itself and for making a judgment to prevent the overheating and other troubles of the motor by averaging the power of the motor using the square mean and by comparing the average value and the rated torque of the motor.

Also, there is a method of finding the disturbance torque exerted on the driving system and arms from the driving current of the motor, which is, however, intended to estimate a sudden disturbance, and not intended to find the load torque of the driving system.

As described above, methods of prior art are not intended to find a load exerted on each part of a driving system nor suited for obtaining the data for a preventive maintenance or overhaul of each part of the driving system and for judging the life thereof. These methods are not for detecting a torque exerted on the driving system, and therefore the load torque exerted on the driving system has been estimated by operators based on their experience.

SUMMARY OF INVENTION

An object of the present invention is to detect a load exerted on the driving system of a robot, thereby making it easy to make judgment on the time for the preventive maintenance or overhaul and on the life of the robot driving system.

A robot control apparatus of the present invention comprises: a motor having an output shaft connected to the driving mechanism of the robot; a speed detection means for detecting a rotational angular speed of the motor; an acceleration calculation means for finding the rotational angular acceleration of the motor based on the rotational angular speed; a driving torque calculation means for calculating a driving torque outputted from the motor output shaft using the angular speed, the angular acceleration and a driving current of the motor by subtracting a torque spent inside the motor from a torque generated by the motor; and a display means for displaying said calculated driving torque. As the torque actually exerted on the driving system of the robot is displayed, the maintenance timing and life of the driving system can be judged correctly.

The robot control apparatus further comprises a means for finding an average driving torque based on a motor revolution speed and the calculated driving torque, and the average driving torque is displayed.

The robot control apparatus further comprises: a sampling means for sampling the motor revolution speed and the motor driving current for each predetermined period during the operation of each shaft of the robot driving mechanism; a means for calculating an average revolution speed of the motor at each sampling time based on the motor revolution speed sampled by the sampling means; a means for counting the number of times of sampling made until each sampling time; a means for finding a total operating period of time during which the shaft is in operation by multiplying the counted number of times of sampling by a sampling period; and a means for finding an average driving torque at each sampling time using the motor revolution speed, the driving torque obtained by the driving torque calculation means, an average driving torque obtained at an immediately preceding sampling time, the average revolution speed, the total operating period of time and the sampling period. The average driving torque is displayed by the display means.

The robot control apparatus further comprises a means for finding an average torque and an average revolution speed of on output shaft of the speed reducer based on the average driving torque, the average revolution speed and a reduction ratio of the speed reducer. The average torque and the average revolution speed of the output shaft of the speed reducer are displayed by the display means.

The robot control apparatus further comprises: a means for finding a rated life period of said speed reducer based on a rated torque and a rated revolution speed of the speed reducer, and the average torque and the average revolution speed of the output shaft of the speed reducer; and a means for finding a rated life ratio by dividing the total operation period by the rated life period. The rated life ratio is displayed by the display means.

DETAILED DESCRIPTION OF THE PREFERRED EMBODIMENTS

Figure 1:
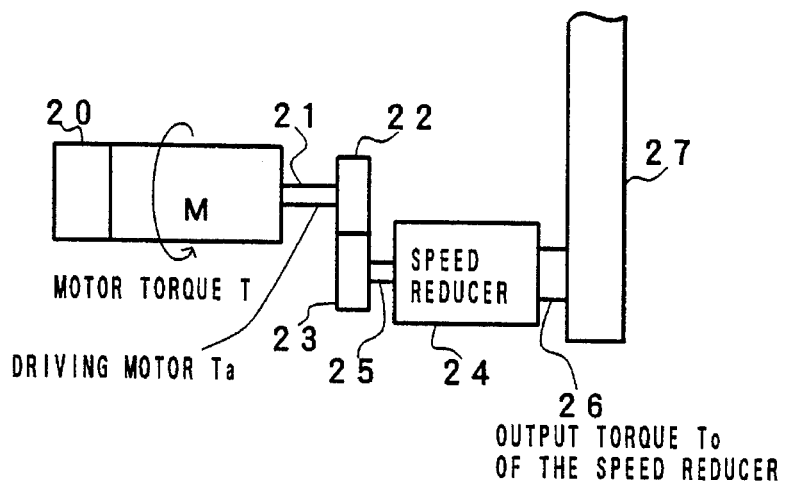
FIG. 1 is an illustrative view for explaining the principle of operation of the present invention.

Referring to FIG. 1, the principle of operation of a first axis of a robot arm driving system in one embodiment of the present invention will be explained. In FIG. 1, reference code M designates a servomotor for driving the above-mentioned first axis, and an encoder 20 detects the rotated position and revolution speed of the servomotor M. A gear 22 is fixedly mounted on an output shaft (rotor shaft) 21 of the servomotor M and engages with a gear 23 fixedly mounted on an input shaft 25 of a speed reducer 24. An arm 27 is fixedly mounted on output shaft 26 of the speed reducer 24.

With this arrangement, the speed reducer 24 is driven through the one-stage gear transmission mechanism by driving the servomotor M, so that the arm is driven by the output shaft 26 of the speed reducer 24. In this case, the reduction ratio of the gear 22 to the gear 23 is 1:1.

A torque T generated by the servomotor M is calculated by multiplying a driving current I of the servomotor by a torque constant Kt, but this torque is not directly outputted to the output shaft 21 of the motor. The torque T includes an acceleration torque for accelerating the rotor itself of the motor, and the torque obtained by subtracting the torque spent inside the motor from the torque T is a driving torque Ta to be outputted from the output shaft 21. When a loss torque coefficient (viscous torque coefficient) of a part which is proportional to the revolution speed of the motor, regarding bearings, oil seals, etc. inside the motor is given as Kv, a friction torque (constant port independent of revolution speed) inside the motor as Kc, a rotor inertia of the motor as Jr, an inertia of the driving system as Jd, a rotational angular velocity as V, and a rotational angular acceleration as $\alpha$, the driving torque Ta outputted from the output shaft 21 of the motor is obtained by the following equation (1):

$$Ta = Kt \cdot I - (Jr + Jd)\alpha - Kv \cdot V - Kc \quad (1)$$

The driving current I is known from a current actually flowing through the motor detected and fed back by a current control section in an axis control circuit, or from a current command obtained in the axis control circuit. The angular velocity V of the motor is known from a velocity feedback signal from the encoder 20. Also, the angular acceleration $\alpha$ of the motor is obtained by differentiating the angular velocity V. Further, the loss torque coefficient Kv, the friction torque Kc inside the motor, the rotor inertia Jr of the motor and the inertia Jd of the driving system are values substantially dependent on the structure of the motor and robot, so that they can be determined by calculation or experiment. Thus, after determining the loss torque coefficient Kv, the friction torque Kc inside the motor, the rotor inertia Jr of the motor and the inertia Jd of the driving system and setting them in the control apparatus, by sequentially sampling the driving current I and velocity V of the motor M to obtain the angular acceleration $\alpha$, and by performing the calculation according to the above-mentioned equation (1), the driving torque Ta outputted from the output shaft 21 of the motor M is derived at each sampling time, to thereby obtain a load actually exerted on the driving system.

An average torque Tmp of the driving torque Ta corresponding to the load on the driving system is derived from the following equation (2):

$$Tmp = \sqrt[p]{\frac{Ta(1)^p \cdot n(1) \cdot \Delta t + Ta(2)^p \cdot n(2) \cdot \Delta t + \ldots}{n(1) \cdot \Delta t + n(2) \cdot \Delta t + \ldots}} \quad (2)$$

In the equation (2), $\Delta t$ represents a sampling period; Ta(1), Ta(2), ... represent driving torques derived from the above-mentioned equation (1) at each sampling time; and n(1), n(2), ... represent motor velocities (the angular velocity V of the motor expressed in terms of number of revolutions) at each sampling time. In the above equation (2), p is a constant dependent on the structure of a driving system, and when the structure of the driving system is based on ball bearings, p is determined to be 3, and when it is based on roller bearings, p is determined to be 10/3. That is, the average torque Tmp is determined by finding cubic mean or 10/3 power mean of the driving torque.

An average revolution speed nm of the output shaft 21 of the motor M, that is, an input shaft of a driving system is derived from the following equation (3):

$$nm = \frac{n(1) \cdot \Delta t + n(2) \cdot \Delta t + n(3) \cdot t + \ldots}{\Delta t + \Delta t + \Delta t + \ldots} \quad (3)$$

However, performing the calculation according to the above-mentioned equations (2) and (3) to find the average torque Tmp of loads on the driving system at each sampling time and the average revolution speed nm of the input shaft of the driving system will become a burden on a processor of a control system performing such calculation. Therefore, in the present invention, by the use of the average speed nm (x−1) and the average torque Tmp (x−1) obtained at a sampling time (x−1) preceding the above-mentioned sampling time (x) by one period, and the motor speed n (x) and the driving torque Ta (x) obtained at the above-mentioned sampling time (x), the average speed nm (x) and the average torque Tmp (x) at the above-mentioned sampling time (x) are derived from the following recurrence equations (4) and (5):

$$nm(x) = \frac{nm(x-1) \cdot \Delta t \cdot N(x-1) + n(x) \cdot \Delta t}{\Delta t \cdot N(x-1) + \Delta t} \quad (4)$$

$$Tmp(x) = \sqrt[p]{\frac{Tmp(x-1)^p \cdot nm(x-1) \cdot \Delta t \cdot N(x-1) + Ta(x)^p \cdot n(x) \cdot \Delta t}{nm(x-1) \cdot \Delta t \cdot N(x-1) + n(x) \cdot \Delta t}} \quad (5)$$

In the above equations (4) and (5), N(x−1) represents the total number of sampling at the sampling time (x−1) preceding the above-mentioned sampling time (x) by one period.

Further, in this embodiment, the rated life ratio of the speed reducer 24 is found and displayed. The life of the speed reducer can be judged on the basis of the average torque of loads on the output shaft. In this embodiment, an average torque Tomp of an output torque To of the output shaft 26 of the speed reducer 24 is found by multiplying the average torque Tmp of the output shaft 21 of the motor M found in the above-mentioned equation (2) or (5) by a reduction ratio R of the speed reducer 24 and by a speed reduction efficiency $\eta$ as shown in the equation (6):

$$Tomp = Tmp \times R \times \eta \quad (6)$$

Also, an average revolution speed nm of the output shaft 26 of the speed reducer 24 is found by multiplying the average speed nm of the motor M found in the equation (3) or (4) by an inverse number (1/R) of the reduction ratio; and then based on a rated life period of time K (hour), a rated torque Tr (Kgf.m) and a rated number of revolutions nr (rpm) of the speed reducer 24, a life period of time Lorp (hour) of the speed reducer is found by performing the calculation using the following equation (7):

$$Lorp = K \times \frac{nr}{nom} \times \left[ \frac{Tr}{Tomp} \right]^p \quad (7)$$

Also, a total operation period of time Q (=N(x)×Δt) of the speed reducer 24 is found (with fractions omitted) in a time unit Q' (hour), and then the total operation period of time Q' is divided by the life Lorp of the above-mentioned speed reducer to find a rated life ratio Ror (=Q'/Lorp), which is then displayed.

Figure 2:
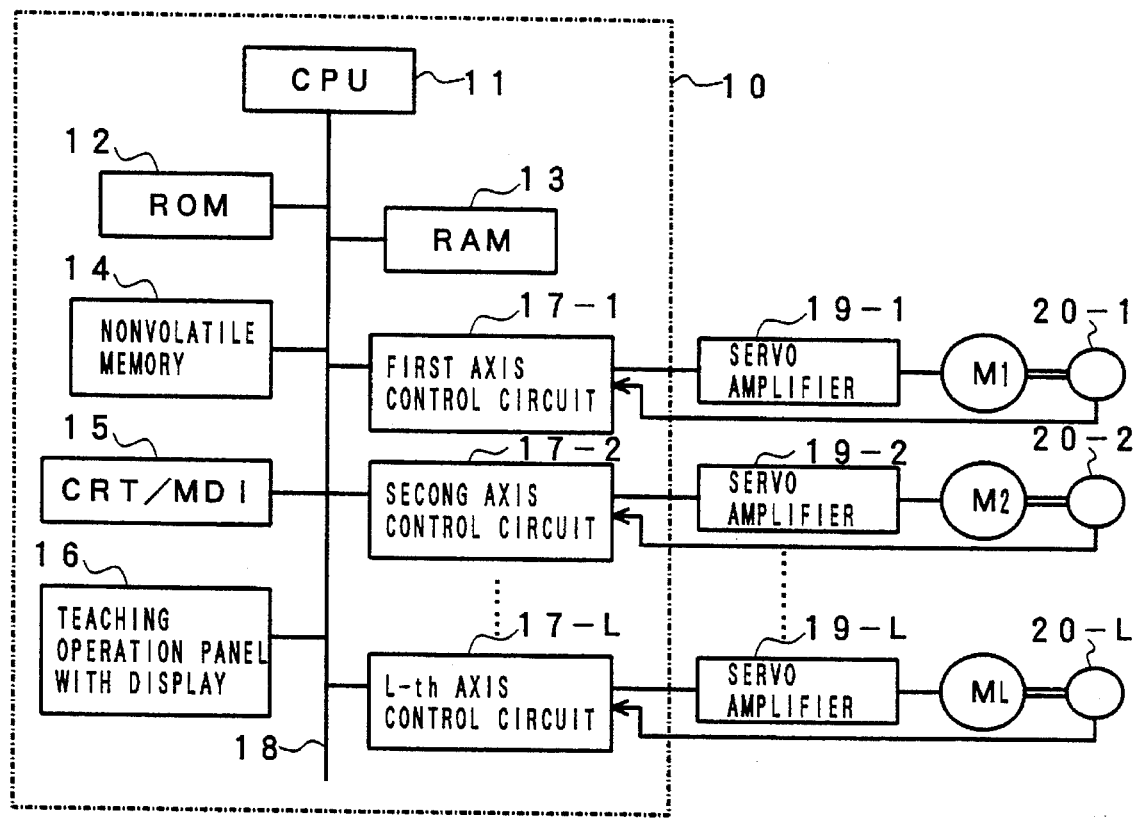
FIG. 2 is a block diagram of a robot control apparatus according to an embodiment of the present invention.

FIG. 2 is a block diagram of a robot control apparatus according to one embodiment of the present invention.

A control device 10 includes a processor (CPU) 11, which is connected through a bus 18 to a ROM 12 for storing a control program, a RAM 13 for temporarily storage of data, a nonvolatile memory 14 for storing instruction data to a robot and data of robot operating state, etc., which will be described later, a CRT/MDI 15 for inputting various set value data of the robot and for displaying such set data and the operating state, a teaching operation panel 16 with a display for teaching an operation to the robot, and axis control circuits 17-1 through 17-L for driving and controlling various axes of the robot. The axis control circuits 17-1 through 17-L are respectively connected through respective servo amplifiers 19-1 through 19-L to servomotors M1 through ML, which respectively drive various axes of the robot, in order to receive the feedback signals of position and speed from respective encoders 20-1 through 20-L, which detect the rotational position and revolution speed of the servomotors M1 through ML.

Figure 3:
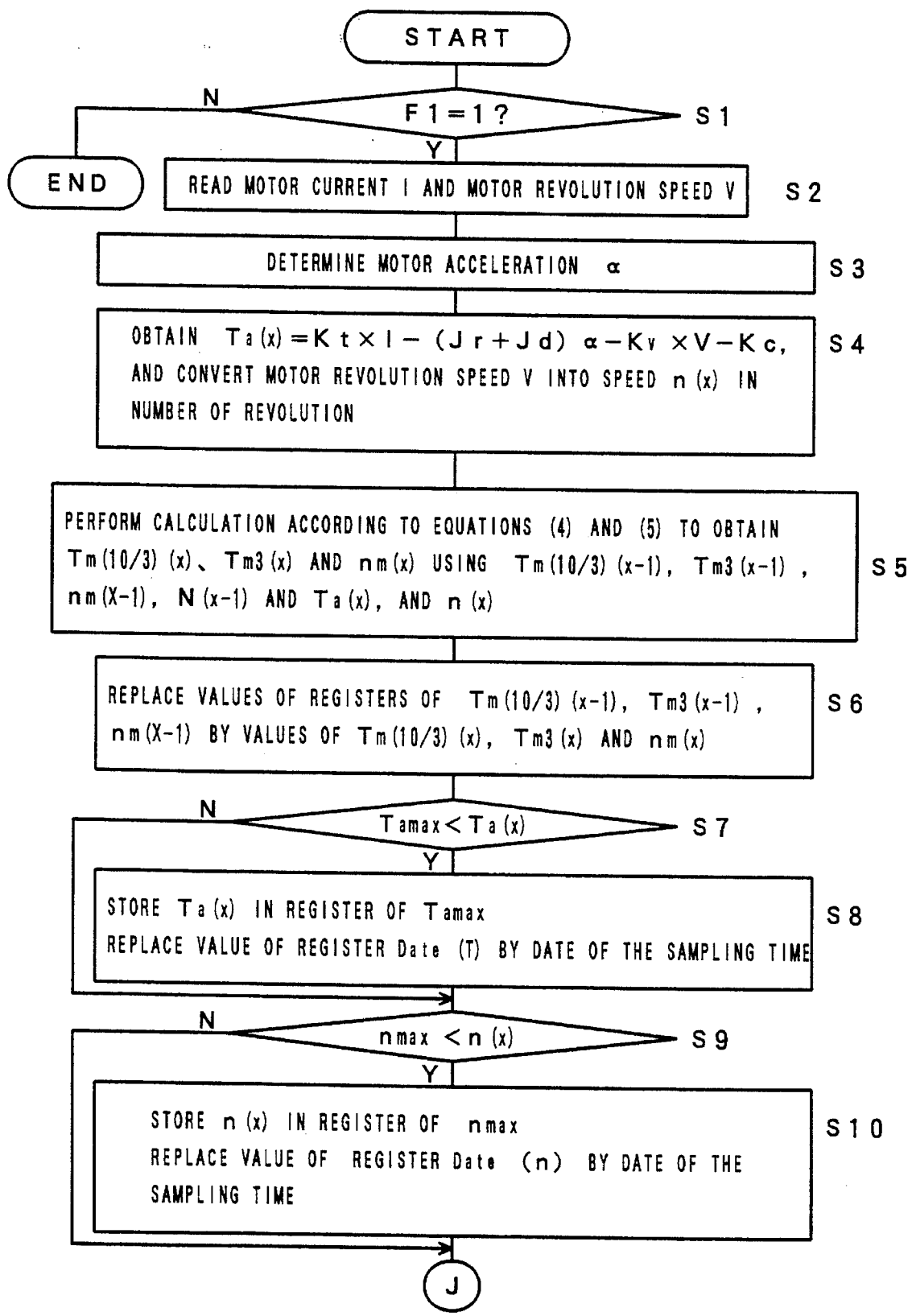
FIG. 3 is part of a flow chart of a monitor processing to be executed by a CPU of the robot control apparatus shown in FIG. 2.
Figure 4:
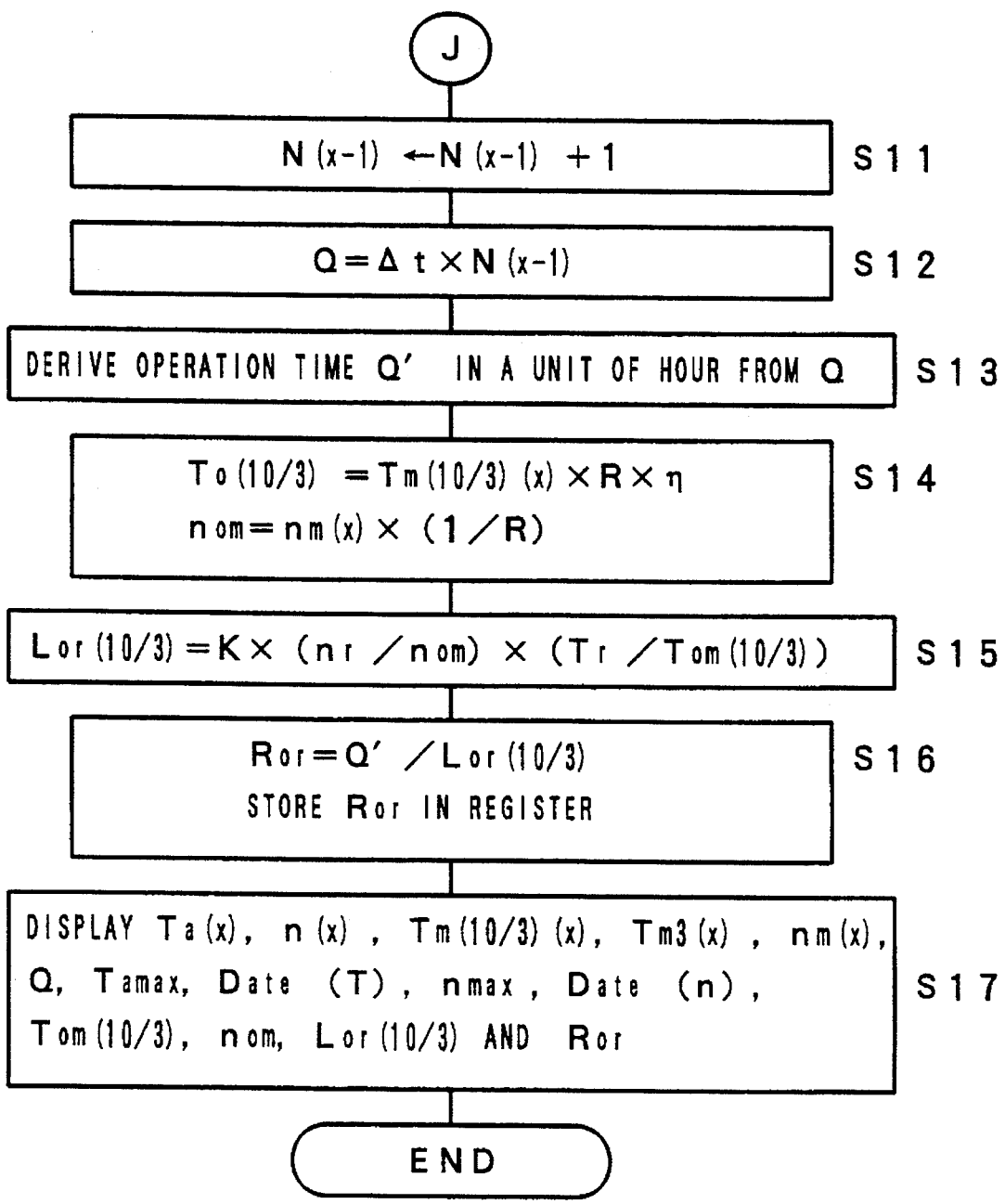
FIG. 4 is the continuation of the flow chart of FIG. 3.

FIGS. 3 and 4 show a flow chart of a monitor processing with respect to the axis executed by the CPU 11 in one embodiment of the present invention.

Before starting the operation of a robot, an operator operates the teaching operation panel 16 or the CRT/MDI 15 to set the torque constant Kt of a servomotor, the internal loss torque coefficient (viscous torque coefficient) Kv of the motor, the internal friction torque Kc of the motor, the rated torque Tr of a speed reducer, the rated number of revolutions nr, the reduction ratio R, and the rated life K. Then, when the operation of the robot is started, the processor 11 of the robot control apparatus 10 executes a processing shown in FIGS. 3 and 4 for each predetermined sampling period and displays the driving torque Ta and the like outputted from the output shaft of the motor on a display of the teaching operation panel 16 or on a CRT display unit of the CRT/MDI 15.

First, it is judged whether an operation command has been outputted or not with respect to an axis of a driving mechanism to be monitored (step S1). In this embodiment, "1" has been set for a flag F1 with respect to an axis to which the operation command has been outputted. Thus, it is judged whether the flag F1 has been set at "1" or not, and if not, the processing for the present period is ended immediately. When the flag F1 has been set at "1", the motor driving current (current instruction or current feedback value) I, and the motor velocity (velocity feedback value from the encoder 20) V are read (step S2). Then, by subtracting the motor velocity read for the previous period from the motor velocity V read-for the present period, the motor acceleration a is found (step S3). Then, by performing the calculation according to the equation (1), the driving torque Ta (x) of the motor output shaft for the present sampling period (x) is obtained, and at the same time, the motor angular velocity V thus read is converted into the speed n (x) (rpm) in the number of revolutions (step S4).

Then, by the use of an average driving torque Tm (10/3) (x−1) for roller bearings, an average driving torque Tm3 (x−1) for ball bearings, an average revolution speed nm (x−1), and the number of times of sampling N (x−1), all of which have been found at the preceding sampling time (preceded by one period) and stored in a register provided in the nonvolatile memory 14, and also by the use of the driving torque Ta (x) and the revolution speed n (x) for the present which have been found at step S4, the calculations by the formals (4) and (5) are performed to find an average revolution speed nm (x), average driving torques Tm (10/3) (x) and Tm3 (x) up to the present sampling period (step S5). At this stage, in Tmp (x) according to the equation (5), P=10/3 (when the structure of the driving mechanism is based on roller bearings), and P=3 (when the structure of the driving mechanism based on ball bearings) are obtained to determine the average driving torques Tm (10/3) (x) and Tm3 (x), respectively.

Then, the average driving torques Tm (10/3) (x) and Tm3 (x), and the average revolution speed nm (x) all of which have been found this time at step S5 are stored in respective registers storing the average driving torque Tm (10/3) (x−1) for roller bearings, the average driving torque Tm3 (x−1) for ball bearings, and the average revolution speed nm (x−1), all of which have been obtained for the preceding sampling period (step S6).

Further, the value of a register storing a maximum value Tamax of driving torque is compared with the driving torque Ta (x) found in step S4 (step S7), and only when the driving torque Ta (x) is larger than the value of Tamax, the driving torque Ta (x) is stored in the register storing the maximum value Tamax of driving torque. Further, the value of a Date (T) register which is provided in the nonvolatile memory 14 and stores the date of a sampling time when the maximum driving torque is generated, is replaced by a current date read from a clock (not shown) provided in the control device (step S8), and the processing proceeds to step S9. Also, when the value of the register in step S7 is equal to or more than the driving torque Ta (x) found presently, the processing proceeds to step S9 without executing the processing of step 8.

Further, in step S9, the value of a register storing a maximum revolution speed n max is compared with the motor revolution speed n (x) at the present sampling time obtained in step S4, and only when the motor revolution speed n (x) is larger than the value of the register, the value of the register storing the maximum revolution speed n max is replaced by the motor revolution speed n (x), and, in the same manner as described above, the value of a Date (n) register storing the maximum speed of the motor is replaced by the date of the present sampling time.

Then, "1" is added to a counter N (x−1) for counting the number of times of sampling (step S11), and the total operation period of time Q is found by multiplying the value of the above-mentioned counter by the sampling period Δt (step 12). Further, this total operation time Q is converted into operation time Q' (with fraction omitted) in an unit of hour.

Then, the average output torque Tomp of the speed reducer 24 is found by multiplying the average driving torque stored in the register in step S6 by the reduction ratio R and the speed reduction efficiency η of the speed reducer. In this embodiment, an RV speed reducer is adopted as the speed reducer, which is based on roller bearings, so that P is determined to be 10/3. The average output torque Tom (10/3) (=Tm (10/3) (x)×R×η) is found by multiplying the average driving torque Tmp (x)=Tm (10/3) (x) by the reduction ratio R and the speed reduction efficiency η. Also, the average revolution speed nom (=nm (x)×1/R) of the output shaft 26 of the speed reducer 24 is found by multiplying the average revolution speed nm (x) stored in step S6 by the inverse number of the reduction ratio R (step 14), and by the use of the average output torque Tom (10/3) and the average revolution speed nom thus found, the calculation according to the equation (7) is performed (with P given as 10/3) to find the life period of time Lot (10/3) of the speed reducer (step S15). Then, the rated life ratio Rot (=Q'/Lor (10/3)) is found by dividing the total operation period of time Q' obtained in step S13 by the life Lot (10/3) of the above-mentioned speed reducer, and the value thus found is stored in a register (step S16). Then, displayed on the screen of the CRT display unit 15 or on the display of the teaching operation panel 16 are the driving torque Ta (x) outputted from the motor shaft of the motor, the revolution speed n (x), the average driving torque Tm (10/3) (x) for roller bearings, the average driving torque Tm3 (x) for ball bearings, the average revolution speed nm (x), the total operation period of time Q, the maximum driving torque Tamax and its date Date (T), the maximum revolution speed nmax and its date Date (n), the life period of time Lot (10/3) of the speed reducer, and the rated life ratio Ror of the speed reducer, all of which have been found in the above-mentioned processings and stored in respective registers in the nonvolatile memory 14.

In this embodiment, the speed reducer is exemplified by the RV speed reducer whose constitution is based on roller bearings; however, in the case of a speed reducer whose constitution is based on ball bearings, the average output torque Tom3 (x) of the speed reducer will be obtained by using the average driving torque Tm3 (x) for ball bearings, the reduction ratio R and the speed reduction efficiency η at step S14. The calculation according to the equation (7) will be preformed to find the life Lot3 of the speed reducer, using the average output torque Tom3 (x) and the average revolution speed nom. Further, the rated life ratio Rot will be obtained, using thus obtained the life Lot3 at step S16.

According to the present invention, a torque actually outputted to the driving system of a robot is monitored. Particularly, a load exerted on the driving system is obtained and monitored by subtracting a torque which is spent in a motor itself for accelerating or decelerating a rotor from an output torque of the motor for driving each axis of a robot. Thus, the judgments for the time for the preventive maintenance or overhaul, and the length of life of a driving system is made easier. Also, the life of a speed reducer in use is displayed as a rated life ratio, so that the life of the speed reducer is easily predicted.

We claim:

1. A robot control apparatus for monitoring a load exerted on a robot comprising:

a motor having an output shaft connected to a driving mechanism of said robot;

speed detection means for detecting a rotational angular speed of said motor;

acceleration calculation means for determining a rotational angular acceleration of said motor based on said rotational angular speed;

driving torque calculation means for calculating a driving torque outputted from said motor output shaft by determining a torque spent inside the motor using said rotational angular speed and said rotational angular acceleration, by determining a torque generated by the motor using a driving current of said motor and by subtracting said torque spent inside the motor from said torque generated by said motor; and display means for displaying said calculated driving torque.

2. A robot control apparatus according to claim 1, further comprising means for determining an average driving torque of said motor output shaft based on the motor rotational angular speed and said driving torque, wherein said display means further displays said average driving torque.

3. A robot control apparatus according to claim 1, further comprising:

sampling means for sampling the motor rotational angular speed and the motor driving current at each predetermined period during an operation of each shaft of said robot driving mechanism;

means for calculating an average rotational speed of the motor at each said predetermined period based on said motor rotational angular speed sampled by said sampling means;

means for counting a number of times of said sampling until each said predetermined period;

means for determining a total operating period of time during which said shaft is in operation by multiplying said counted number of times of sampling by a sampling period; and means for determining an average driving torque at each said predetermined period using said motor rotational angular speed, said driving torque obtained by said driving torque calculation means, an average driving torque obtained at an immediately preceding said predetermined period, said average rotational speed, the total operating period of time and said predetermined period, wherein said display means further displays said average driving torque.

4. A robot control apparatus according to claim 3, wherein said sampling means samples a motor driving current based on a move command to each shaft of said driving mechanism according to an operation program of said robot.

5. A robot control apparatus according to claim 3, wherein said driving mechanism comprises a speed reducer, said robot control apparatus further comprises means for determining an average torque and an average revolution speed of an output shaft of said speed reducer based on said average driving torque, said average rotational speed of said motor and a reduction ratio of said speed reducer, and said display means further displays the average torque and the average revolution speed of the output shaft of said speed reducer.

6. A robot control apparatus according to claim 5, further comprising: means for determining a rated life period of said speed reducer based on a rated torque and a rated revolution speed of said speed reducer, and said average torque and said average revolution speed of the output shaft of said speed reducer; and means for determining a rated life ratio by dividing said total operation period by said rated life period, wherein said display means further displays said rated life ratio.

7. A robot control apparatus according to claim 2, wherein said means for determining the average driving torque Tm obtains a cubic mean of said driving torque Ta when a structure of said driving system is based on ball bearings, and determines a 10/3 power mean of said driving torque Ta when the structure of said driving system is based on roller bearings, and wherein said display means further displays said cubic mean and 10/3 power mean.

8. A robot control apparatus as set forth in claim 1, further comprising memory means for storing maximum values of said driving torque and said motor rotational speed, wherein the maximum values stored in said memory means are updated when said driving torque and said motor rotational speed are larger than the respective maximum values stored in said memory means, and said display means further displays said maximum driving torque and said maximum motor rotational speed.

* * * * *